(12) United States Patent
Adams et al.

(10) Patent No.: US 6,681,451 B1
(45) Date of Patent: Jan. 27, 2004

(54) FLEXIBLE PLASTIC TIE

(75) Inventors: William E. Adams, Portersville, PA (US); Matthew H. French, Slippery Rock, PA (US)

(73) Assignee: Adams Mfg. Corp., Portersville, PA (US)

( * ) Notice: Subject to any disclaimer, the term of this patent is extended or adjusted under 35 U.S.C. 154(b) by 0 days.

(21) Appl. No.: 10/223,449

(22) Filed: Aug. 19, 2002

(51) Int. Cl.⁷ ............. F16L 3/08; B65D 63/00
(52) U.S. Cl. ............ 24/16 PB; 24/30.5 P; 24/17 AP
(58) Field of Search ............. 24/16 PB, 17 AP, 24/17 A, 30.5 P, 30 R; 248/74.3

(56) References Cited

U.S. PATENT DOCUMENTS

| | | | |
|---|---|---|---|
| 2,900,696 A | | 8/1959 | Bacon |
| 2,959,098 A | | 11/1960 | Hassman |
| 3,255,501 A | * | 6/1966 | Laguerre |
| 3,486,200 A | * | 12/1969 | Orenick |
| 3,694,863 A | * | 10/1972 | Wasserlein, Jr. ........ 24/16 PB |
| 3,855,670 A | * | 12/1974 | Brudy ................ 24/16 PB |
| 3,887,965 A | * | 6/1975 | Schuplin ............. 24/16 PB |
| 4,235,404 A | | 11/1980 | Kraus |
| RE31,541 E | * | 3/1984 | Wood ................ 24/16 PB |
| 4,817,901 A | * | 4/1989 | Kuo ................. 24/17 AP X |
| 4,910,835 A | | 3/1990 | Carpenter |
| 5,402,971 A | | 4/1995 | Bower |
| 6,561,350 B1 | * | 5/2003 | Ueno ................ 206/343 |

FOREIGN PATENT DOCUMENTS

| | | |
|---|---|---|
| FR | 1110010 | 2/1956 |
| FR | 1126130 | 11/1956 |
| FR | 1253973 | 1/1961 |

* cited by examiner

*Primary Examiner*—Robert J. Sandy
(74) *Attorney, Agent, or Firm*—Buchanan Ingersoll, P.C.

(57) ABSTRACT

A flexible plastic tie molded from a plastic having a durometer of from 60 to 95 has an elongated spine with a plurality of rod-like projections attached to the spine. The projections are arranged in spaced apart pairs such that each pair of projections is co-linear and there is a selected distance between the distal ends of each pair of projections. A fastening head is attached to one end of the spine. There is a generally rectangular slot passing through the fastening head. The slot has a width not less than the width of the spine and less than the selected distance between the distal ends of each pair of projections, such that the slot and the outside surface define a wall encircling the slot. The projections have a height of greater than 1 mm.

18 Claims, 3 Drawing Sheets

FLEXIBLE PLASTIC TIE

FIELD OF INVENTION

The invention relates to retainers that encircle the bundles of cords or similar structures and hold them together.

BACKGROUND OF THE INVENTION

Cable ties have long been used to bundle elongated articles together. Waxed string was one of the earliest devices used to simply tie electrical wire together. Eventually the string was replaced by the plastic cable tie that is made of a highly resilient thermoplastic material. In general, most commercially available cable ties consist of an elongated flexible strap having a pointed or rounded tip at one end and a locking head at the opposite end. The locking head receives the opposing end and a portion of the strap to form a noose or loop of variable size to retain cables therein. Typically, teeth extend from at least one longitudinal surface of the strap. The locking head has a pawl designed to engage the teeth and retain the strap after the strap is wound around the cables. When inserted into the locking head, the strap is tightened to the desired degree of tension by pulling the strap through the pawl. When tight the end of the strap is released causing the locking head to engage one or more of the teeth preventing the strap from being released.

There are many variations on the strap design. One common tie has a flat rectangular head at one end of a strap. The head has a rectangular slot of a selected length and a smaller selected width. The strap has pairs of wing-like projections that extend from the strap at spaced-apart intervals. The widest portion each pair of the wings is slightly less than the length of the slot in the head. The width of the strap between the wings is slightly less than the width of the slot in the head. The end of the strap opposite the head is fitted through the slot forming a loop by twisting the strap so that the wings extend along the length of the slot. After one or more wings are pulled through the slot, the strap is untwisted so that the wings align with the width of the slot. Typically, the wings are thin enough to bend or flex so that the strap can be pulled through the slot to tighten the loop. The shape of the wings and their rigidity enables the wings to resist forces applied in a longitudinal direction preventing the strap from being backed out of the slot. This type of tie is also made of a highly resilient thermoplastic material.

Another type of tie has a strap having a series of spaced apart projections along its length. These projections may be rectangular, cylindrical or even hemispherical. A head is provided at one end of the strap that has a slot or hook shaped to engage the projections. Examples of this type of strap are disclosed in U.S. Pat. No. 2,900,696 to Bacon, U.S. Pat. No. 2,959,098 to Hassman, U.S. Pat. No. 4,235,404 to Kraus and U.S. Pat. No. 5,402,971 to Bower, as well as in French patents 1.110.010, 1.126.130 and 1.253.973. Most of these patents simply say that the strap can be made of plastic without specifying a type of plastic. Kraus says that prior art cable ties have been made of a highly resilient thermoplastic material such as nylon or HALAR. The tie disclosed in his patent is preferably made of a flexible, tough, slightly rubbery material such as SANTOPRENE 101-87 thermoplastic rubber made by Monsanto Corporation.

While nearly all of the ties disclosed in the prior art have been effective for their intended purpose, they tend to feel hard to the touch. The thermoplastic materials from which they are made have a stiff durometer of above 100. Consequently, these ties can be difficult to work with, especially in cold weather. They can easily scratch or cut bare hands, particularly hands that are chapped and cold. Consequently, there is a need for a tie made from a soft plastic having a durometer in the range of from 60 to 95. Such a tie would be particularly useful for hanging Christmas decorations outdoors since these decorations are often hung and taken down in cold weather. Because such decorations are seasonal the tie should be releasable and reusable. The tie should also be secure enough to withstand winter winds acting on the decorations that they are securing. However, we have found that when prior art cable ties are made of soft vinyl the strap and teeth or projections on the strap flex and stretch so much that the strap can be easily pulled away from the head. For this reason there is a need for a tie made of soft plastic that has a head and strap configuration such that the strap cannot easily be pulled through the head releasing the tie.

SUMMARY OF THE INVENTION

We provide a flexible plastic tie having an elongated spine of a selected width. A plurality of hemispherical or rod-like projections are attached to the spine. The projections are arranged in spaced apart pairs such that each pair of projections is co-linear and there is a selected distance between the distal ends of each pair of projections. The selected distance should be substantially the same for all pairs of projections. A fastening head is attached to one end of the spine. The fastening head has a top surface, a bottom surface and outside surfaces extending from the top surface to the bottom surface. There is a generally rectangular slot passing through the fastening head. The slot has a width equal to or greater than the width of the spine and less than the selected distance between the distal ends of each pair of projections, such that the slot and the outside surface define a wall encircling the slot. The elongated spine, rod-like projections and fastening head are integrally molded from a plastic having a durometer of from 60 to 95. Preferably the plastic is polyvinyl chloride, polyethylene or polyurethane. The projections may have a circular, oval, square, rectangular or triangular cross-section. We prefer to provide a seat in the top surface of the head to receive one pair of projections.

DESCRIPTION OF THE PREFERRED EMBODIMENTS

Figure 1:
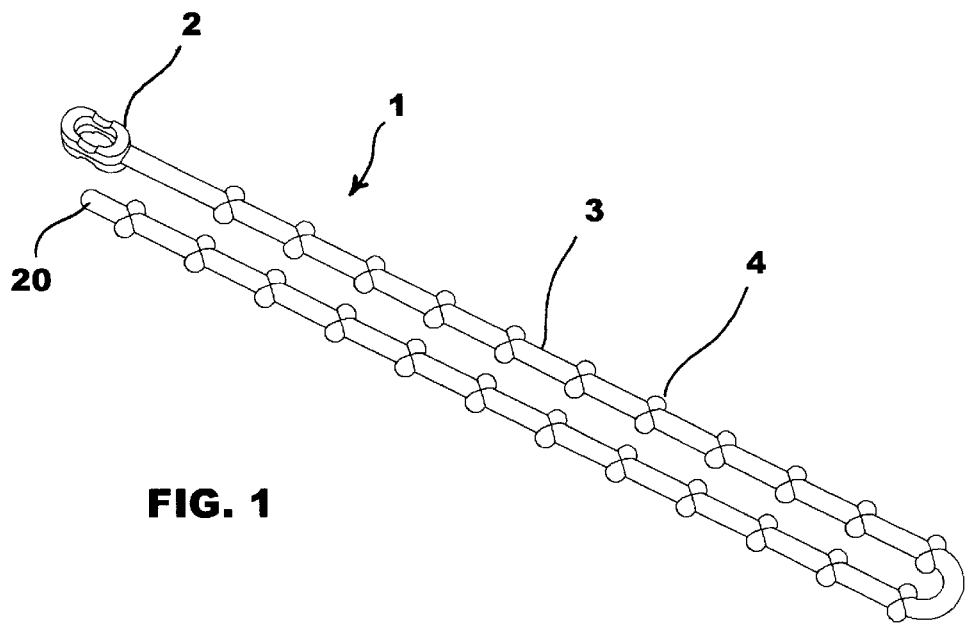
FIG. 1 is a top plan view of a present preferred embodiment of our flexible plastic tie.
Figure 2:
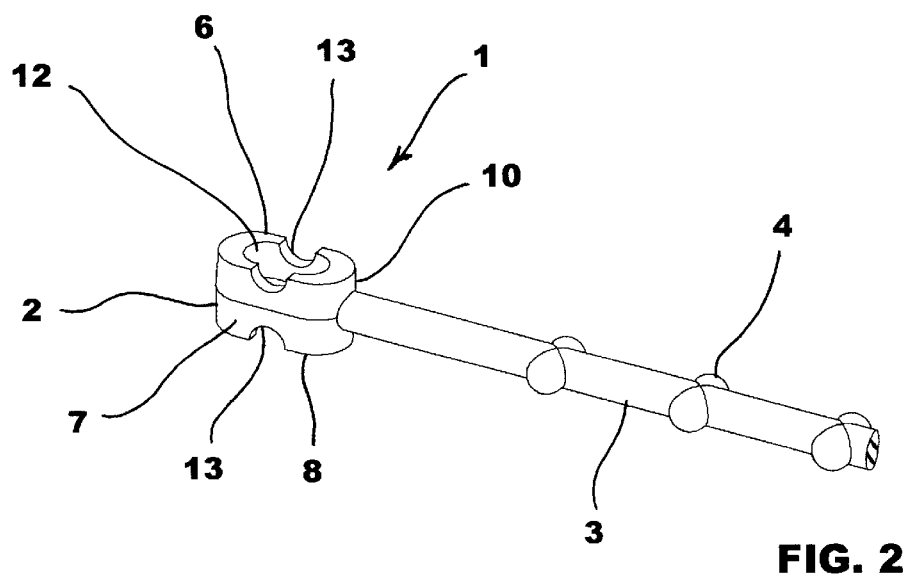
FIG. 2 is a perspective view of the head portion of the flexible plastic tie shown in FIG. 1.

Referring to FIGS. 1 and 2 we provide a flexible plastic tie 1 having a head 2 and a strap or spine 3 extending from the head. There are a series of pairs of rod-like projections 4 extending from the spine at spaced apart intervals. The projections in each pair of projections are co-linear. In a present preferred embodiment the diameter of the spine and the diameter of the rod-like projections are both 3 mm (⅛ inch) and the pairs of projections are 9 mm (⅜ inch) apart.

Figure 3:
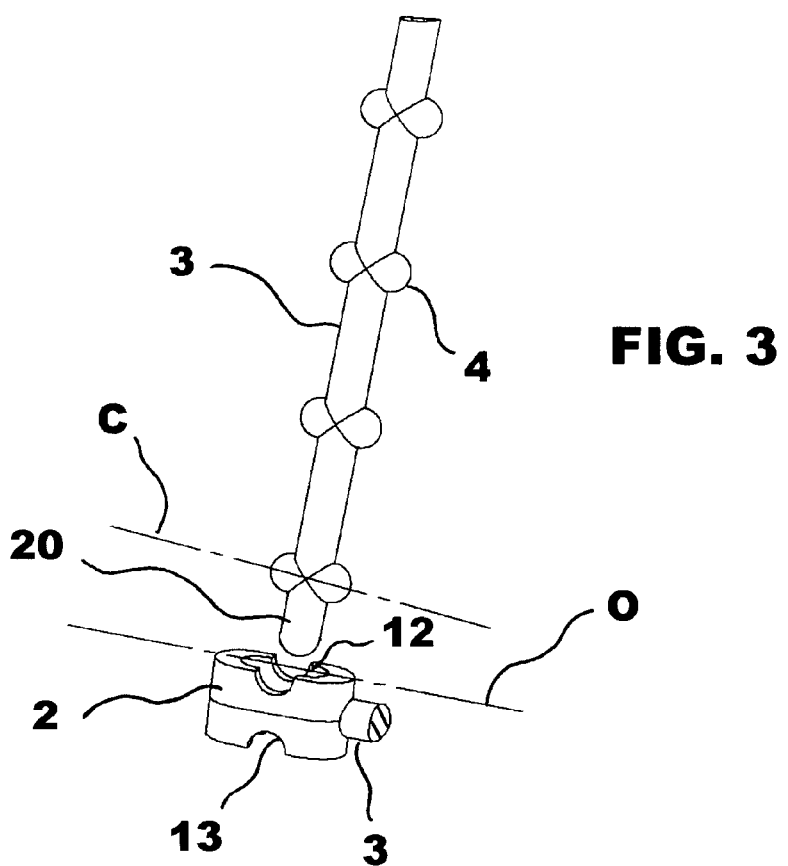
FIG. 3 is a perspective view similar to FIG. 2 showing the end of the tie being inserted into the head.
Figure 4:
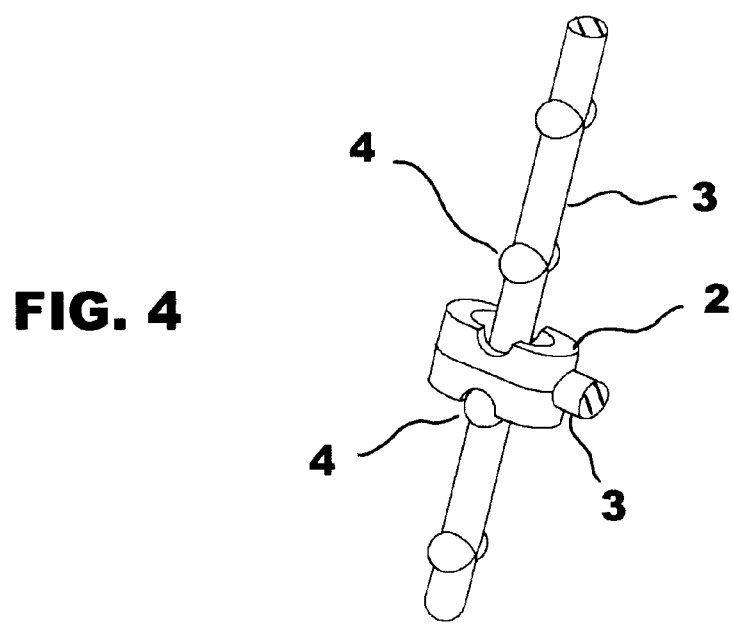
FIG. 4 is a perspective view similar to FIG. 3 showing the end of the tie locked in the head.

The rod-like projections extend 1.5 mm (¹⁄₁₆ inch) from the spine. Consequently, the distance between the distal ends of each pair of projections is 6 mm (¼ inch). The head 2 has a top surface 6, a bottom surface 8 and an outside surface 7 that together form a wall 10. This wall encircles and defines a slot 12 that passes through the head. The slot is sized to have a width equal to or slightly larger than the diameter of the spine 3 and a length slightly longer than the distance between the distal ends of each pair of projections 4. In a preferred embodiment the slot is 7 mm long and 3 mm wide. The thickness of the wall surrounding the slot preferably is greater at locations opposite the ends of the slot than opposite the sides of the slot. In a preferred embodiment these thicknesses are 2.17 mm and 1.5 mm, respectively. When binding cables or mounting decorations to a rail or post the tie 1 is formed into a loop around the objects being joined by inserting the distal end 20 of the spine 3 into the slot 12 in the head 2 as shown in FIG. 3. During insertion the end 20 of the spine 3 is oriented so that a centerline C passing through the first pair of projections is parallel to a centerline D through the length of the slot 12. When so oriented the spine and projections will pass easily through the slot. The spine is then pulled through the slot 12 until a loop of a desired size is formed. After that loop has been formed the spine is turned 90° to align a pair of projections 4 with a seat 13 provided on the bottom surface 8 of the head 2 as shown in FIG. 4. We prefer to provide a seat 13 in both the top surface 6 and the bottom surface 8 so that the user can insert the end of the spine from the top or from the bottom of the head 2.

Figure 5:
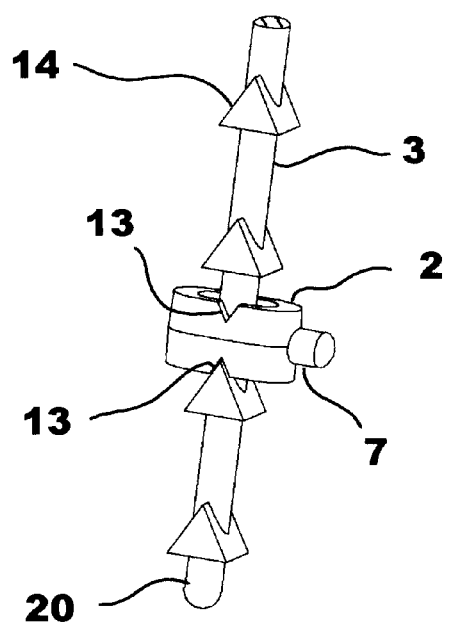
FIG. 5 is a perspective view similar to FIG. 4 showing the end of a second present preferred embodiment of our flexible tie locked in the head.

In the embodiment of FIGS. 1 through 4 the projections are hemispherical. However, the projections could be cylindrical having a circular, oval, square, rectangular or other polygon-shaped cross-section or be hemispherical. In a second preferred embodiment shown in FIG. 5 the projections 14 have a triangular cross-section. Whatever the shape of the projections, the seat 13 should have a corresponding shape. The corresponding shape of the seat provides greater mating surface area of the seat and the projection. This contact area will remain substantially the same when a force acts on the distal end 20 at any angle relative to the head. In the preferred embodiments, the head 2 has a height of 6 mm (¼ inch) from the top 6 to the bottom 8, which is about twice the diameter of the projections.

Tests have been conducted on ties that were molded from 75 durometer polyvinyl chloride to the configuration shown and described as the first present preferred embodiment. Those ties had a spine 33 mm in length and 3 mm in diameter. The projections were hemispherical with a base diameter of 3 mm and a total width of 6 mm from the distal end of one nub through the spine to the distal end of the opposite nub. The head was shaped as the head 2 in FIGS. 1, 2, 3 and 4 with a length of 11 mm, a width of 6 mm and heights that varied from 6 mm to 2 mm. A loop was formed by inserting the distal end into the head as shown in FIG. 4. The loop was placed through an overhead hook. A strain gauge was hooked onto the loop directly below the overhead hook. Then a continually increasing downward force was applied until the spine was pulled through the head.

TABLE 1

| Specimen | Height of Head | Force of Separation |
|---|---|---|
| A | 6 mm | 21 |
| B[1] | 5 mm | 17 |
| B[2] | 5 mm | 14 |
| C[1] | 4 mm | 18 |
| C[2] | 4 mm | 14 |
| D | 3 mm | 12 |
| E | 2.5 mm | 15 |

[1]Projections were in curved seat.
[2]Projections rested against flat bottom.

Table 1 shows the results of the tests. Specimens B and C were configured to have a top with a seat and a bottom which was flat. Those specimens were first tested with the nubs seated on the flat bottom. Then they were tested with the nubs seated in a curved seat. The surface against which the nubs rested in specimens D and E were flat. The test results indicate that the force required to separate the loop is related to the height of the head. The results for specimens B and C show that the tie is stronger when the nubs are in a curved seat than when they are on a flat surface. For best results, the height of the head should be at least 4 mm.

A second similar test was conducted with three ties each having the same head configuration. The head was like head 2 in FIGS. 1, 2, 3 and 4. The slot had a width of 3 mm and the walls surrounding the slot were 1.5 mm thick adjacent the long sides and 2.17 mm adjacent the ends of the slot. The projections on one specimen were 1.5 mm and the spine was 3 mm in diameter. In a second specimen the nubs were 1 mm in height and in a third specimen the nubs were 0.5 mm in height. A force of 21 pounds was required to pull the spine through the head in the first specimen. Loops with the projections at 1 mm and 0.5 mm separated at forces of 5 pounds and 4 pounds, respectively. From these tests we conclude that the projections must be greater than 1 mm in height for a 75 durometer tie.

Finally, a similar tie made from the same vinyl material was tested. However, the head was shaped as a J-hook with a slot similar to the head in the tie disclosed in U.S. Pat. No. 4,235,404 to Kraus. The loop formed by this tie easily pulled apart with a force of one pound. That occurred because the projections surrounding the slot flexed apart under the force allowing the projection to pass through the slot.

From these test results we concluded that the size of the head and the size of the projections were key to the holding ability of a soft durometer tie. The correspondence of the shape of the seat and shape of the projections also improved the holding power of the tie. We attribute the improved performance of the embodiment having seats over the embodiment without seats to greater surface area contact and a corresponding increase in friction between the head and the projections.

Another advantage to the softer durometer tie is that the tie can be molded in a folded shape similar to the configuration of the tie shown in FIG. 1. Consequently, the mold can be about half as long as a mold needed to make the same tie with a straight spine. Ties of the prior art made of a thermoplastic material are molded with a straight spine and therefore, require more costly molds. When molded in a folded shape as shown in FIG. 1, the distance between the pairs of projections on either side of the fold may be further apart than are other adjacent pairs of projections. In a preferred embodiment the pairs of projections on either side of the fold are 12 mm (½ inch) apart while the distance between all other adjacent pairs of projections is 10 mm (about ⅜ inch).

While we prefer to make our tie of 75 durometer polyvinyl chloride, a durometer in a range from 60 to 90 could be used. One could use other plastics of 60 to 90 durometer, such as polyurethane, polyethylene and some block copolymers. Should one choose to use a higher durometer than 75, the height and wall thickness in the head can be thinner. Similarly, if a durometer of less than 75 is used then it may be desirable to provide a greater wall thickness and taller head. We further prefer to mold the flexible plastic tie from a clear plastic. Then the tie will be less noticeable when used to hang holiday decorations.

Although we have described and shown certain present preferred embodiments of our flexible plastic tie it should be distinctly understood that the invention is not limited thereto but may be variously embodied within the scope of the following claims.

We claim:

1. A flexible plastic tie comprising:
   a. an elongated spine of a selected width and a selected length having a first end and a second end;
   b. a plurality of projections attached to the spine, the projections having a height greater than 1 mm and arranged in spaced apart pairs such that each pair of projections is co-linear and there is a selected distance between the distal ends of each pair of projections, the selected distance being substantially the same for all pairs of projections; and
   c. a fastening head attached to one end of the spine, the fastening head having a top surface, a bottom surface and outside surfaces extending from the top surface to the bottom surface, the fastening head having a slot passing through the fastening head, the slot having a width not less than the width of the spine and less than the selected distance between the distal ends of each pair of projections, the slot further having a length not less than the distance between the distal ends of each pair of projections such that the slot and the outside surface define a wall encircling the slot,
      wherein the elongated spine, projections and fastening head are integrally molded from a plastic having a durometer of from 60 to 95 and in a configuration in which the elongated spine is folded into a U-shape.

2. The flexible plastic tie as claimed in claim 1 wherein the elongated spine, plurality of projections and the fastening head are made from a material selected from the group consisting of polyvinyl chloride, polyethylene and polyurethane.

3. The flexible plastic tie as claimed in claim 1 wherein the elongated spine, plurality of projections and the fastening head are made from a clear plastic material.

4. The flexible plastic tie as claimed in claim 1 wherein the wall has at least one seat positioned on the top surface or the bottom surface of the head, the slot sized to receive one of the pairs of projections while a portion of the spine is within the slot.

5. A flexible plastic tie comprising:
   a. an elongated spine of a selected width and a selected length having a first end and a second end;
   b. a plurality of projections attached to the spine, the projections having a height greater than 1 mm and arranged in spaced apart pairs such that each pair of projections is co-linear and there is a selected distance between the distal ends of each pair of projections, the selected distance being substantially the same for all pairs of projections; and
   c. a fastening head attached to one end of the spine, the fastening head having a top surface, a bottom surface and outside surfaces extending from the top surface to the bottom surface, the fastening head having a slot passing through the fastening head, the slot having a width not less than the width of the spine and less than the selected distance between the distal ends of each pair of projections, the slot further having a length not less than the distance between the distal ends of each pair of projections such that the slot and the outside surface define a wall encircling the slot, the wall having at least one seat positioned on the top surface or the bottom surface of the head, the slot sized to receive one of the pairs of projections while a portion of the spine is within the slot
      wherein the elongated spine, projections and fastening head are integrally molded from a plastic having a durometer of from 60 to 95 and wherein the projections and the seat have triangular cross-sections.

6. The flexible plastic tie as claimed in claim 4 wherein the projections and the seat have rectangular cross-sections.

7. A flexible plastic tie comprising:
   a. an elongated spine of a selected width and a selected length having a first end and a second end;
   b. a plurality of hemispherical projections attached to the spine, the projections having a height greater than 1 mm and arranged in spaced apart pairs such that each pair of projections is co-linear and there is a selected distance between the distal ends of each pair of projections, the selected distance being substantially the same for all pairs of projections; and
   c. a fastening head attached to one end of the spine, the fastening head having a top surface, a bottom surface and outside surfaces extending from the top surface to the bottom surface, the fastening head having a slot passing through the fastening head, the slot having a width not less than the width of the spine and less than the selected distance between the distal ends of each pair of projections, the slot further having a length not less than the distance between the distal ends of each pair of projections such that the slot and the outside surface define a wall encircling the slot,
      wherein the elongated spine, projections and fastening head are integrally molded from a plastic having a durometer of from 60 to 95.

8. The flexible plastic tie as claimed in claim 1 wherein the spine has a point between two adjacent pairs of the projections and those two adjacent pairs of projections are spaced apart a first distance and there is a second distance different from the first distance between all other adjacent pairs of projections.

9. The flexible plastic tie as claimed in claim 8 wherein the first distance is 12 mm and the second distance is 10 mm.

10. The flexible tie as claimed in claim 1 wherein the selected distance between the distal ends of each pair of projections is twice the width of the spine.

11. The flexible tie of claim 10 wherein the selected distance between the distal ends of each pair of projections is 6 mm and the width of the spine is 3 mm.

12. The flexible tie of claim 1 wherein the wall encircling the slot has a greater thickness at locations adjacent opposite ends of the slot than at locations adjacent opposite sides of the slot.

13. The flexible tie of claim 12 wherein the wall has a thickness of 1.5 mm adjacent the ends of the slot and a thickness of at least 2 mm adjacent the sides of the slot.

14. The flexible tie of claim 1 wherein the slot has a length of 7 mm and a width of 3 mm.

15. The flexible tie of claim 1 wherein the tie is polyvinyl chloride of 75 durometer and the wall encircling the slot has a thickness of at least 1.5 mm and a height of at least 4 mm.

16. The tie of claim 1 wherein adjacent pairs of projections are spaced apart from one another and the two adjacent pairs of projections nearest that portion of the spine which is folded are spaced apart a distance which is greater than all distances between any other two pairs of adjacent projections.

17. The tie of claim 1 wherein the slot is generally rectangular.

18. A flexible plastic tie comprising:

a. an elongated spine of a selected width and a selected length having a first end and a second end;

b. a plurality of rod-like projections, each projection having a hemispherical distal end and attached to the spine, the projections having a height greater than 1 mm and arranged in spaced apart pairs such that each pair of projections is co-linear and there is a selected distance between the distal ends of each pair of projections, the selected distance being substantially the same for all pairs of projections; and c. a fastening head attached to one end of the spine, the fastening head having a top surface, a bottom surface and outside surfaces extending from the top surface to the bottom surface, the fastening head having a generally rectangular slot passing through the fastening head, the slot having a width not less than the width of the spine and less than the selected distance between the distal ends of each pair of projections, the slot further having a length not less than the distance between the distal ends of each pair of projections such that the slot and the outside surface define a wall encircling the slot, wherein the elongated spine, projections and fastening head are integrally molded from a plastic having a durometer of from 60 to 95.

\* \* \* \* \*